(12) United States Patent
Lai et al.

(10) Patent No.: US 8,217,871 B2
(45) Date of Patent: Jul. 10, 2012

(54) TOUCH-CONTROLLED LIQUID CRYSTAL DISPLAY AND TOUCH PANEL THEREOF

(75) Inventors: Hui-Lung Lai, Southern Taiwan Science Park (TW); Chun-Jung Chen, Southern Taiwan Science Park (TW); Jung-Hsin Huang, Southern Taiwan Science Park (TW)

(73) Assignee: Chi Hsin Electronics Corp., Tainan (TW)

( * ) Notice: Subject to any disclaimer, the term of this patent is extended or adjusted under 35 U.S.C. 154(b) by 811 days.

(21) Appl. No.: 12/354,760

(22) Filed: Jan. 15, 2009

(65) Prior Publication Data
US 2010/0033436 A1   Feb. 11, 2010

(30) Foreign Application Priority Data
Aug. 8, 2008 (TW) .............................. 97130352 A (51) Int. Cl.
*G06F 3/041* (2006.01)
(52) U.S. Cl. .............. 345/87; 345/98; 345/96; 345/173; 349/156; 349/139; 349/12; 349/114
(58) Field of Classification Search .......................... None
See application file for complete search history.

(56) References Cited

U.S. PATENT DOCUMENTS

| | | | | |
|---|---|---|---|---|
| 4,927,240 A * | 5/1990 | Stolov et al. | .................... | 349/81 |
| 5,184,118 A * | 2/1993 | Yamazaki | ....................... | 345/96 |
| 5,729,319 A * | 3/1998 | Inou et al. | ..................... | 349/156 |
| 5,739,803 A * | 4/1998 | Neugebauer | .................... | 345/98 |
| 5,831,702 A * | 11/1998 | Ito | ................... | 349/12 |
| 6,369,865 B2 * | 4/2002 | Hinata | ............. | 349/12 |
| 6,771,327 B2 * | 8/2004 | Sekiguchi | ....................... | 349/12 |
| 2002/0033920 A1 * | 3/2002 | Sun | ............................... | 349/139 |
| 2008/0180618 A1 * | 7/2008 | Fujieda | ........................ | 349/114 |
| 2009/0146933 A1 * | 6/2009 | Visser et al. | .................... | 345/87 |
| 2010/0085344 A1 * | 4/2010 | Ogawa et al. | ................. | 345/211 |

* cited by examiner

*Primary Examiner* — Van Chow
(74) *Attorney, Agent, or Firm* — Chun-Ming Shih (57) ABSTRACT

A touch-controlled LCD includes a liquid crystal display panel and a touch panel. The liquid crystal display panel includes a first substrate, a second substrate and a liquid crystal layer disposed between the first substrate and the second substrate. The touch panel is disposed on a side of the second substrate facing away from the liquid crystal layer. The touch panel includes a plurality of first electrodes being parallel to each other, a plate shaped second electrodes facing the first electrodes, and a plurality of spacers disposed between the first electrodes and the second electrode.

21 Claims, 6 Drawing Sheets

TOUCH-CONTROLLED LIQUID CRYSTAL DISPLAY AND TOUCH PANEL THEREOF

CROSS-REFERENCE TO RELATED APPLICATION

This application claims the priority benefit of Taiwan application serial no. 97130352, filed Aug. 8, 2008, the full disclosure of which is incorporated herein by reference.

BACKGROUND

1. Field of the Invention

The present invention relates to a touch-controlled liquid crystal display and a touch panel thereof, and more specifically, to a multi-touch liquid crystal display and a touch panel thereof.

2. Description of Related Art

With the development of electronic technology, touch panel as an input apparatus has been widely used in various kinds of flat panel display devices such as liquid crystal displays (LCDs). Currently, touch panels can be divided into three categories: resistive panels, capacitive panels and inductive panels, among which resistive panels are especially popular because of their simple manufacturing process and the low manufacturing cost.

A touch panel of a typical LCD normally includes an upper conductive substrate, a lower conductive substrate, and a spacer disposed therebetween. The upper and lower conductive substrates respectively include a substrate and a conductive film covered thereon. The conductive film can be an ITO (Indium Tin Oxide) film. A resistive touch panel usually detects the touching position by sensing a distributed voltage and only one touching position can be detected at a time. If a user touches and presses more than one place on the touch panel, the touch panel is incapable of detecting the multiple touched positions. In other words, the conventional resistive touch panels cannot be controlled in a multi-touch fashion, which greatly limits the application of touch-controlled displays.

BRIEF SUMMARY

An object of the present invention is to provide a touch-controlled LCD that can be controlled in a multi-touch fashion.

Another object of the present invention is to provide a multi-touch touch panel.

A touch-controlled LCD according to a preferred embodiment of the present invention is provided. The touch-controlled LCD includes a liquid crystal display panel and a touch panel. The liquid crystal display panel includes a first substrate, a second substrate and a liquid crystal layer disposed between the first substrate and the second substrate. The touch panel is disposed on a side of the second substrate facing away from the liquid crystal layer. The touch panel includes a plurality of first electrodes being parallel to each other, a plate shaped second electrodes facing the first electrodes, and a plurality of spacers disposed between the first electrodes and the second electrode so as to separate the first electrodes and the second electrode.

A touch panel for realizing multi-touch control of a flat panel according to a preferred embodiment of the present invention is provided. The touch panel includes a plurality of first electrodes parallel with each other; a plate shaped second electrode facing the first electrodes; and a plurality of spacers disposed between the first electrodes and the second electrode for separating the first electrodes and the second electrode.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
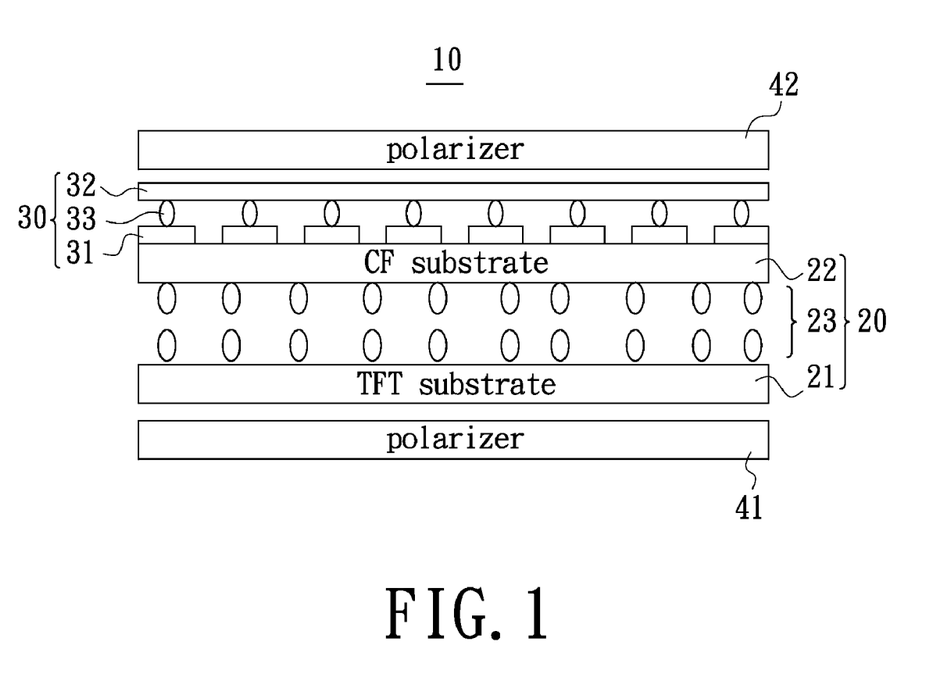
FIG. 1 is a cross-sectional view of a touch-controlled LCD according to a preferred embodiment of the present invention.

Referring to FIG. 1, a touch-controlled LCD 10 according to a preferred embodiment of the present invention is provided. The touch-controlled LCD 10 includes a LCD panel 20 and a touch panel 30.

The LCD panel 20 includes a first substrate 21, a second substrate 22 and a liquid crystal layer 23 disposed between the first substrate 21 and the second substrate 22. In this embodiment, the first substrate 21 can be a thin film transistor (TFT) substrate, on which a plurality of thin film transistors are disposed. The second substrate 22 can be a color filter (CF) substrate, on which a plurality of color filters are disposed.

The touch panel 30 is disposed on the LCD panel 20. More specifically, the touch panel 30 is disposed on a side of the second substrate 22 that is facing away from the liquid crystal layer 23. The touch panel 30 includes multiple first electrodes 21, which are parallel with each other, a plate shaped second electrode 32, and multiple spacers 33. The plate shaped second electrode 32 is disposed facing the first electrodes 31. The spacers 33 are disposed between the first electrodes 31 and the second substrate 32 so as to separate the first electrodes 31 and the second substrate 32.

In this embodiment, the touch-controlled LCD 10 further includes a polarizer 41 and a polarizer 42. The polarizer 41 is disposed on the first substrate 21 of the LCD panel 20. The second polarizer 42 is disposed on the touch panel 30.

In addition, in this embodiment, the first electrodes 31 are disposed on a side of the second substrate 22 that is facing away from the liquid crystal layer 23. The first electrodes 31 can be formed by applying transparent conductive layers that are parallel with each other and made from ITO onto the second substrate 22. The plate shaped second electrode 32 and the first electrodes 31 are respectively disposed on the two sides of the spacers 33. The second electrode 32 can be in contact with the polarizer 42.

It is to be understood that, in practice, the first electrodes 31 and the plate shaped electrode 32 can be exchanged in position. In other words, the second electrode 32 can be disposed on a side of the second substrate 22 that is facing away from the liquid crystal layer 23. In addition, the first electrodes 31 are parallel with and spaced from each other so that they are insulated from one another. The spacers 33 can be made from transparent and elastic materials.

Figure 2A:
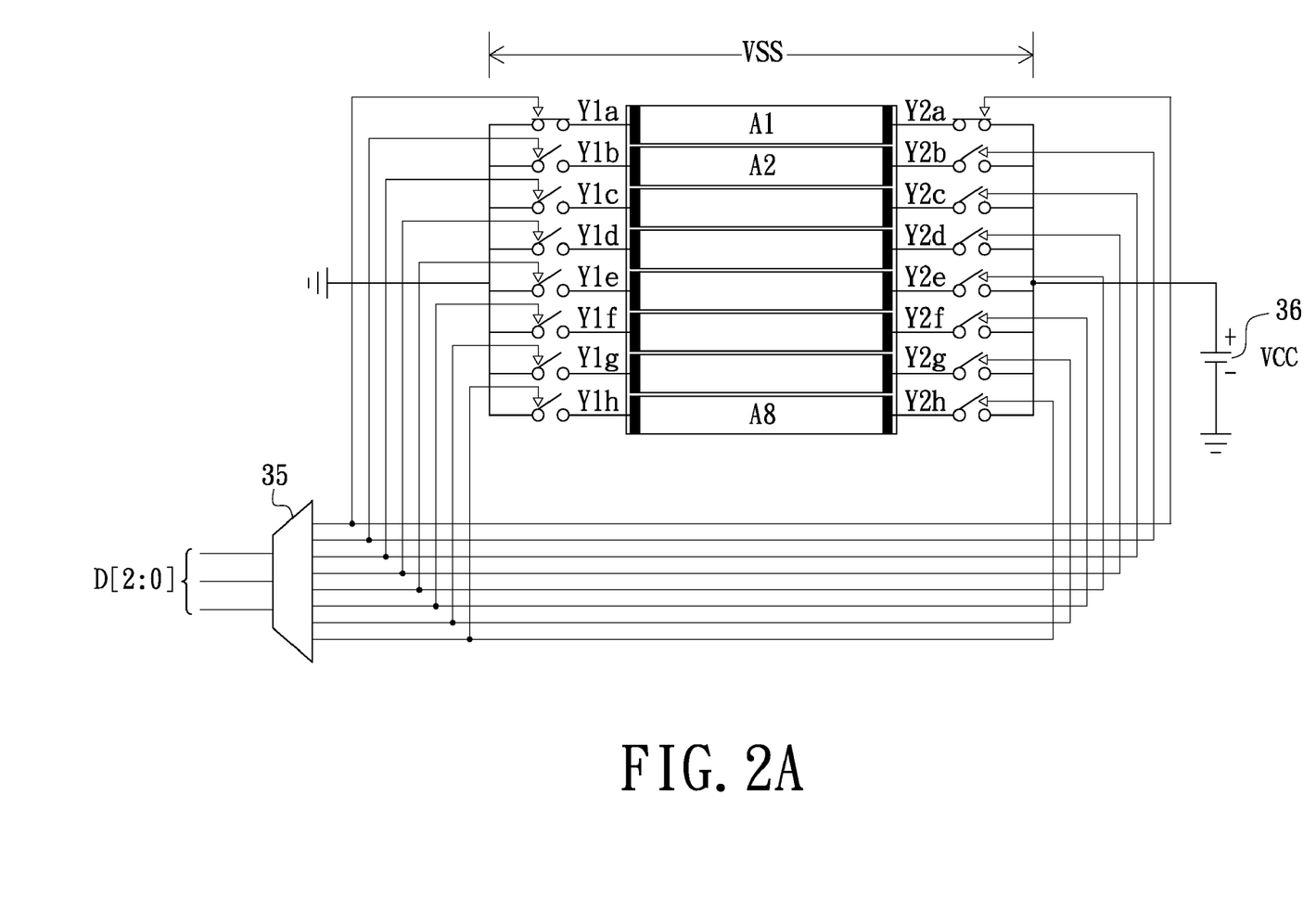
FIG. 2A and FIG. 2B are schematic diagrams of a detecting circuit of a touch panel of the touch-controlled LCD depicted in FIG. 1.
Figure 2B:
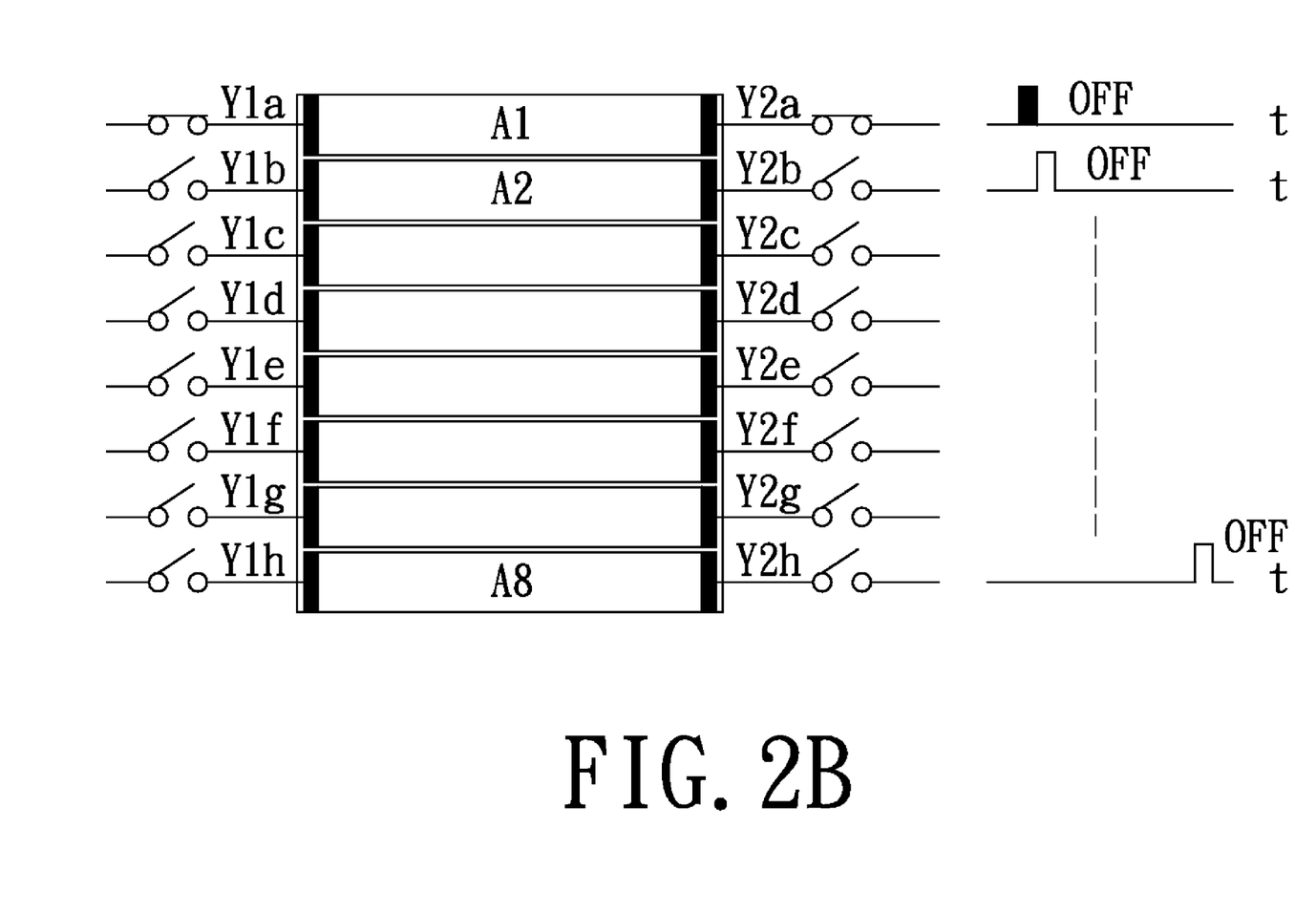

Referring to 2A-2B, a schematic diagram of a detecting circuit of the touch panel 30, the touch panel 30 further includes multiple control switch pairs [Y1a, Y2a], ..., [Y1h, Y2h], a demultiplexer 35 and a power supply 36. The control switch pairs [Y1a, Y2a], ..., [Y1h, Y2h] are respectively electrically coupled to the first electrodes 31. The number of the control switch pairs [Y1a, Y2a], ..., [Y1h, Y2h] corresponds to the number of the first electrodes 31. In this embodiment, the first electrodes 31 include eight electrodes A1, A2, ... A8, and the corresponding eight control switch pairs [Y1a, Y2a], ..., [Y1h, Y2h].

The outputs of the demultiplexer 35 are respectively electrically coupled to the control switch pairs [Y1a, Y2a], ..., [Y1h, Y2h] so as to control the open/closed status thereof. The demultiplexer 35 is an m to n demultiplexer, wherein $2^m \geq n$. In this embodiment, the demultiplexer 35 is a 3 to 8 demultiplexer. A scanning signal is input to the inputs of the demultiplexer 35 so that the outputs of the demultiplexer 35 output corresponding control signals that sequentially close the control switch pairs [Y1a, Y2a], ..., [Y1h, Y2h]. Thus, the electrodes A1, ..., A8 can be sequentially electrically coupled to the power supply 36 through the control switch pairs [Y1a, Y2a], ..., [Y1h, Y2h]. The scanning signal can be a digital signal.

In this embodiment, a coordinate is constructed wherein the direction parallel with the extending direction of A1, ..., A8 is taken as the Y axis. By sequentially scanning A1 through A8, the Y coordinate of the touched point is detected as follows.

When t=t1, the scanning signal that is input into the inputs of the demultiplexer 35 is 000, the control signal output from the demultiplexer 35 is 00000001. Now the first control switch pair [Y1a, Y2a] is closed to connect the two sides of the electrode A1 so that the electric potential on the electrode A1 VSS=VCC, as shown in FIG. 2A. At this moment, all other control switch pairs [Y1b, Y2b], ..., [Y1h, Y2h] are open so that the two sides of the other electrodes A2, ..., A8 are not connected. This is the time when the electrode A1 is scanned to detect whether the touched point is located on the electrode A1.

After a time period of Δt, that is, when t=t1+Δt, the input scanning signal at the inputs of the demultiplexer 35 changes to 001, and the corresponding outputs of the demultiplexer 35 changes to 00000010. Now, the first control switch pair [Y1a, Y2a] is open so as to disconnect the two sides of the electrode A1, and the second control switch pair [Y1b, Y2b] is closed so as to connect the two sides of the second electrode A2. Thus, the electric potential on the electrode A2 VSS=VCC, and all electrodes A1, ..., A8 except A2 are floating. This is the time when the electrode A2 is scanned to detect whether the touched point is located on the electrode A2.

By the above rules, when t=t1+(n−1)Δt, the input scanning signal at the inputs of the demultiplexer 35 changes to 111, and the corresponding outputs of the demultiplexer 35 changes to 10000000. Now, the eighth control switch pair [Y1b, Y2b] is closed so as to connect the two sides of the eighth electrode A8. This is the time when the electrode A8 is scanned to detect whether the touched point is located on the electrode A8. This way, the system has conducted a complete scan to the touch panel.

By sequentially scanning the multiple electrodes A1, ..., A8, the electrode where the touched point is located can be accurately detected and the Y coordinate of the touched point can be further determined. In addition, by measuring the voltage distributed on that electrode, the X coordinate of the touched point can be calculated.

It is to be understood that the detecting circuit provided by this embodiment scans the electrodes in a time sequence. As a result, even when there are multiple touched points, the Y coordinates of these touched points can still be accurately detected, and the X coordinates thereof can be calculated from the distributed voltages. Hence, multi-touch control is realized by the touch panel 30 provided by this embodiment and LCD displays having the touch panel 30.

Figure 3A:
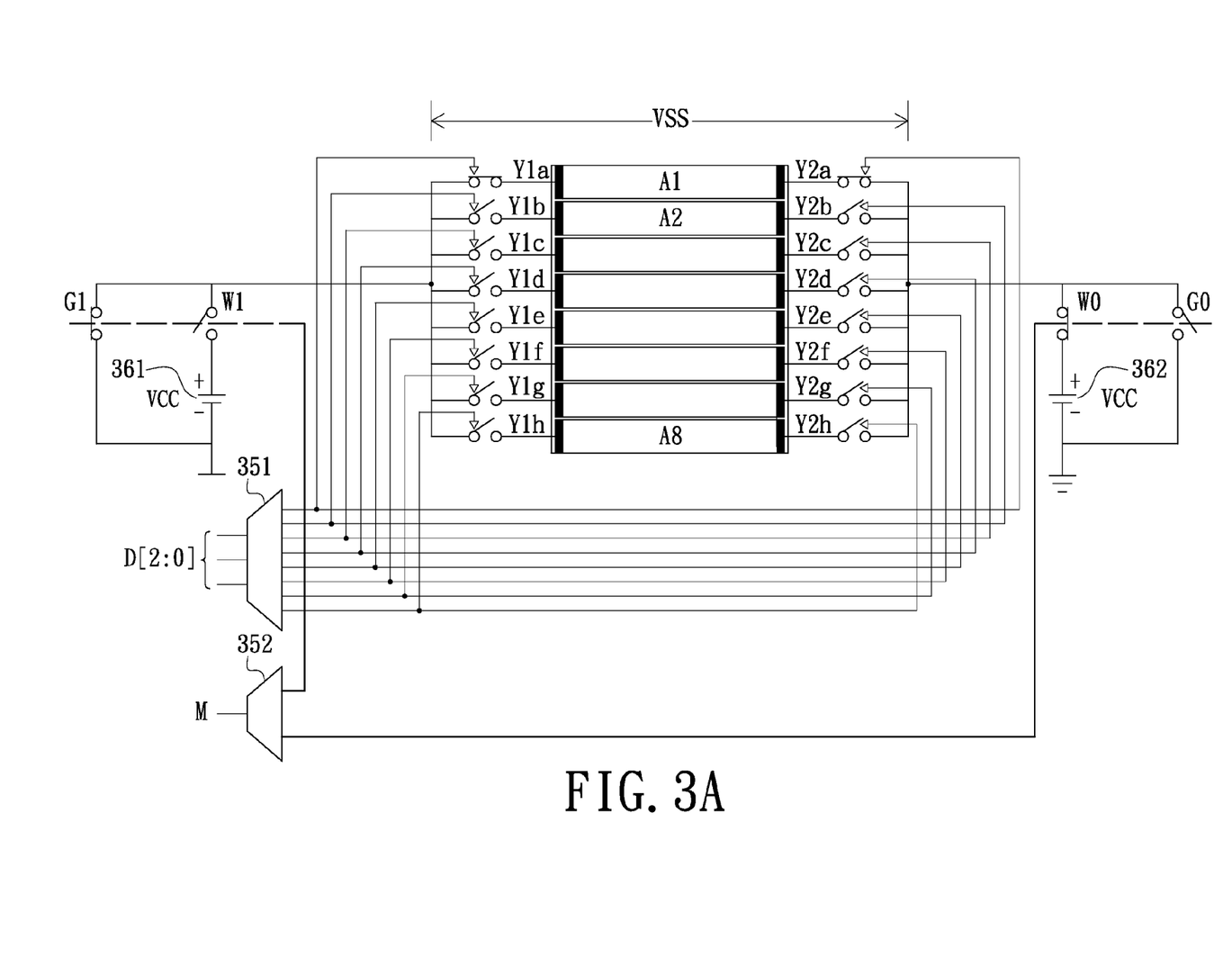
FIG. 3A and FIG. 3B are schematic diagrams of a detecting circuit of a touch panel of a touch-controlled LCD according to another embodiment of the present invention.
Figure 3B:
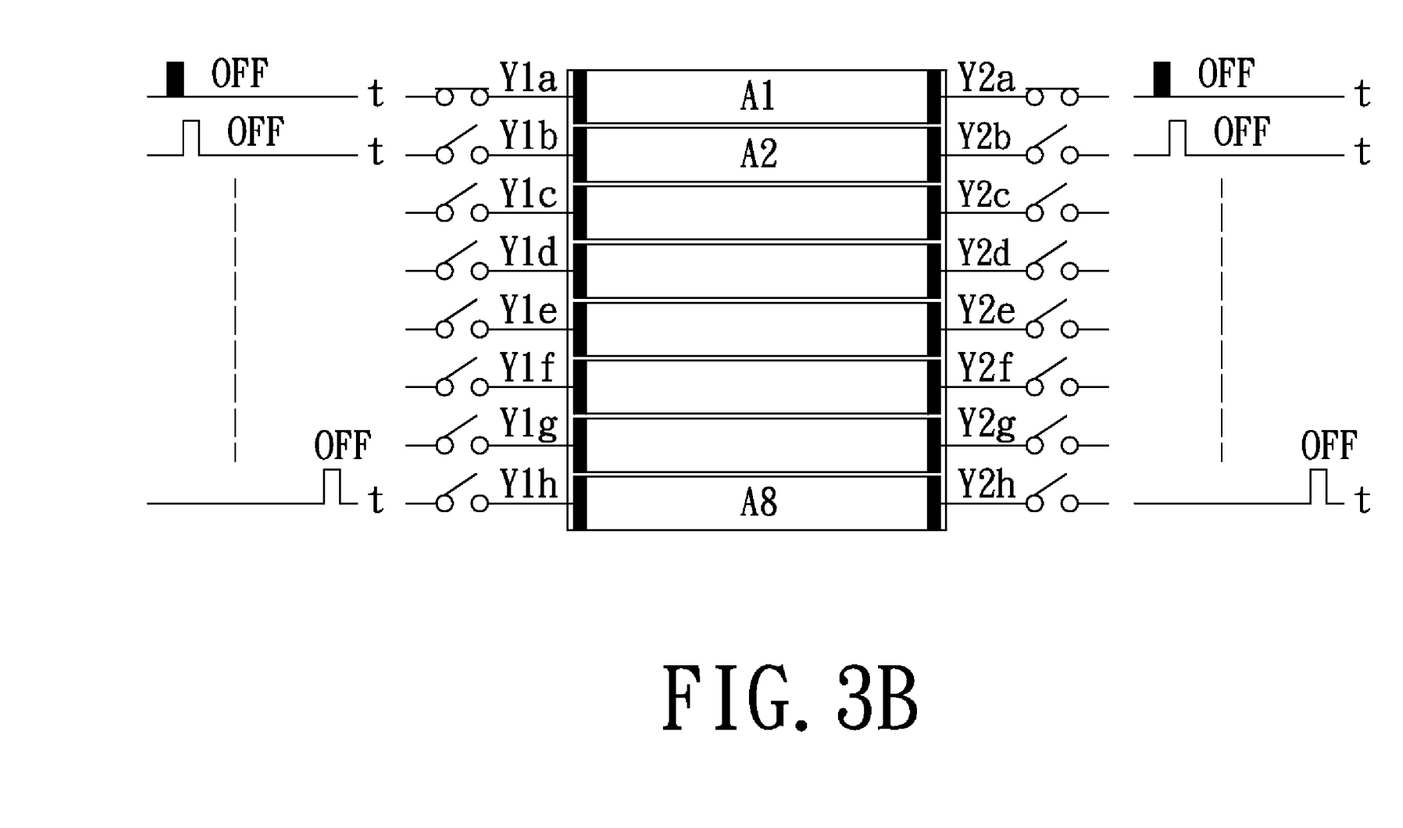

Referring to FIG. 3A-3B, a touch panel according to another embodiment of the present invention is provided. The resistive touch panel includes multiple first control switch pairs [Y1a, Y2a], ..., [Y1h, Y2h], two second control switch pairs [W0, G1] and [W1, G0], a first demultiplexer 351, a second demultiplexer 352, a first power supply 361 and a second power supply 362. The output voltage of the first power supply 361 is the same as the second power supply 362. The first control switch pairs [Y1a, Y2a], ..., [Y1h, Y2h] are respectively electrically coupled to the electrodes A1, ..., A8. The number of the first control switch pairs [Y1a, Y2a], ..., [Y1h, Y2h] corresponds to the number of the electrodes. In this embodiment, there are eight electrodes A1, ..., A8 and eight first control switch pairs one-by-one corresponding to the eight electrodes.

In this embodiment, referring to FIG. 3A the second control switch pairs [W0, G1] and [W1, G0] are used to control an electrode, for example, the electrode A1, so that the voltage of the right side of the electrode is higher than the voltage of the left side of the electrode, after which the configuration of the second control switch pairs [W0, G1] and [W1, G0] is changed so that at a different time the voltage of the left side of the electrode is higher than the voltage of the right side of the electrode. This method can be called crossover scanning, by which the possibility of the system making an error judgment can be decreased.

Figure 4:
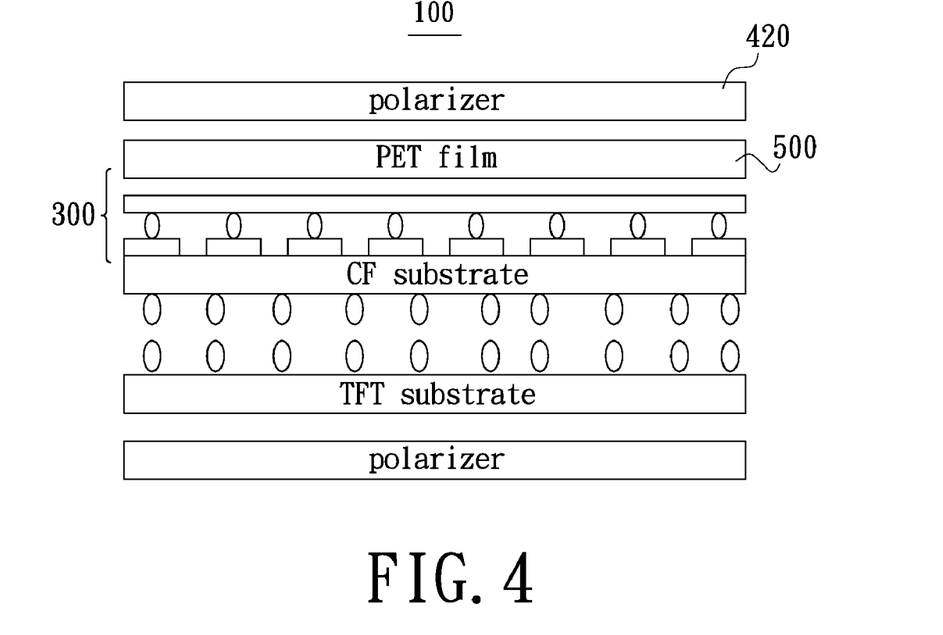
FIG. 4 is a cross-sectional view of the touch-controlled LCD according to still another embodiment of the present invention.

Referring to FIG. 4, a touch-controlled LCD 100 according to still another embodiment of the present invention is provided. The LCD 100 is similar to the LCD 10 provided by the embodiment in FIG. 1 except that the LCD 100 further includes a polyester film 500 disposed between the polarizer 420 and the touch panel 300. The polyester film 500 can be a Polyethylene Terephthalate (PET) film. The plate shaped second electrodes of the touch panel 300 can be formed by applying a transparent conductive layer, such as an ITO (Indium Tin Oxide) layer, onto the PET film 500.

Figure 5:
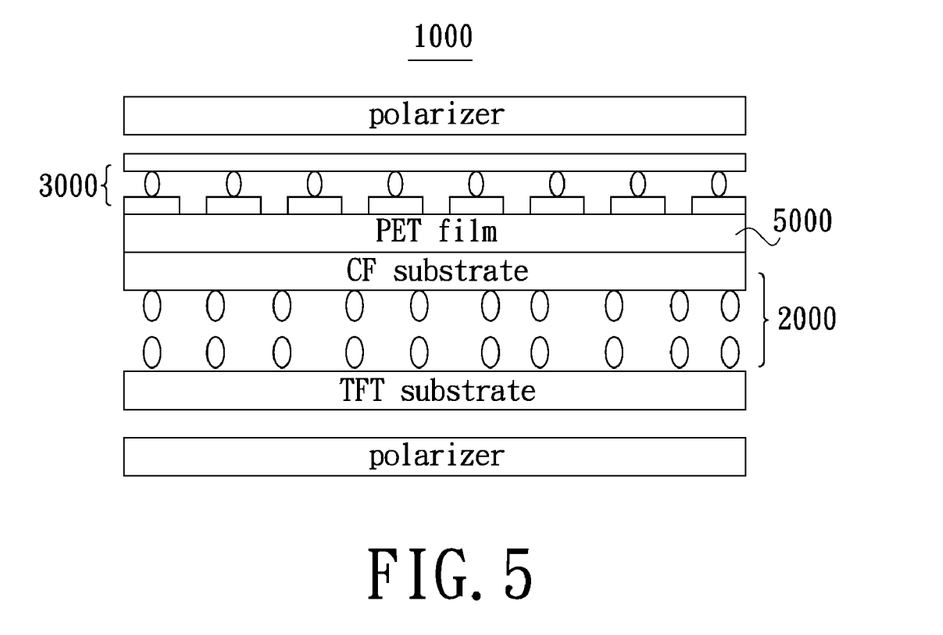
FIG. 5 is a cross-sectional view of a touch-controlled LCD according to yet another embodiment of the present invention.

Referring to FIG. 5, a touch-controlled LCD 1000 according to yet another embodiment of the present invention is provided. The LCD 1000 is similar to the LCD 10 provided by the embodiment in FIG. 1 except that the LCD 1000 further includes a polyester film 5000 disposed between the second substrate of the LCD panel 2000 (the CF substrate) and the touch panel 3000. The polyester film 500 can be a Polyethylene Terephthalate (PET) film. The first electrodes of the touch panel 3000 can be formed by applying multiple transparent conductive layers, such as ITO (Indium Tin Oxide) layers, that is parallel to each other onto the PET film 5000.

In the above embodiments, the touch panel and the LCD having the touch panel includes multiple first electrodes. By sequentially scanning these electrodes, first coordinates of touched points can be determined; by further measuring the distributed voltages on the electrodes, second coordinates of the touched points can be determined. Thus multi-touch control on a LCD is achieved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A touch-controlled liquid crystal display comprising:
   a liquid crystal display panel comprising a first substrate, a second substrate and a liquid crystal layer disposed between the first substrate and the second substrate; and
   a touch panel disposed on a side of the second substrate facing away from the liquid crystal layer, the touch panel comprising:
   a plurality of first electrodes, the first electrodes being parallel to each other;
   a plate shaped second electrodes facing the first electrodes;
   a plurality of spacers disposed between the first electrodes and the second electrode so as to separate the first electrodes and the second electrode;
   a plurality of first control switch pairs;
   two second control switch pairs;
   a first demultiplexer;
   a second demultiplexer;
   a first power supply; and
   a second power supply,
   wherein the first power supply and the second power supply are respectively configured for outputting a voltage, the first electrodes are electrically coupled to the first power supply and the second power supply respectively through the first control switches and the second control switches, the outputs of the first demultiplexer are electrically coupled to the first control switches, a first scanning signal is inputted to the inputs of the first demultiplexer so that a corresponding first control signal is outputted from the outputs of the first demultiplexer so as to sequentially close the first control switch pairs, the outputs of the second demultiplexer are electrically coupled to the second control switches, and a second scanning signal is inputted to the inputs of the second demultiplexer so that a corresponding second control signal is outputted from the outputs of the second demultiplexer so as to sequentially close the second control switch pairs.

2. The touch-controlled liquid crystal display of claim 1, further comprising a first polarizer disposed on the first substrate and a second polarizer disposed on the touch panel.

3. The touch-controlled liquid crystal display of claim 2, further comprising a polyester film disposed between the second polarizer and the touch panel.

4. The touch-controlled liquid crystal display of claim 3, wherein the polyester film is a Polyethylene Terephthalate (PET) film.

5. The touch-controlled liquid crystal display of claim 1, further comprising a polyester film disposed between the second substrate and the touch panel.

6. The touch-controlled liquid crystal display of claim 5, wherein the polyester film is a Polyethylene Terephthalate (PET) film.

7. The touch-controlled liquid crystal display of claim 1, wherein the first electrodes are disposed on a side of the second substrate facing away from the liquid crystal layer.

8. The touch-controlled liquid crystal display of claim 7, wherein the first electrodes are formed by applying transparent conductive layers that are parallel with each other onto a side of the second substrate facing away from the liquid crystal layer.

9. The touch-controlled liquid crystal display of claim 8, wherein the transparent conductive layers are Indium Tin Oxide layers.

10. The touch-controlled liquid crystal display of claim 1, wherein the second electrode is disposed on a side of the second substrate facing away from the liquid crystal layer.

11. The touch-controlled liquid crystal display of claim 10, wherein the second electrode is formed by applying a transparent conductive layer onto a side of the second substrate facing away from the liquid crystal layer.

12. The touch-controlled liquid crystal display of claim 11, wherein the transparent conductive layer is an Indium Tin Oxide layer.

13. The touch-controlled liquid crystal display of claim 1, wherein the touch panel further comprises a plurality of control switch pairs, a demultiplexer and a power supply, the first electrodes are electrically coupled to the power supply through the control switch pairs, the outputs of the demultiplexer are respectively electrically coupled to the control switch pairs so as to control the control switch pairs, and a scanning signal is input to the inputs of the demultiplexer so that a corresponding control signal is output from the outputs of the demultiplexer so as to sequentially close the control switch pairs.

14. The touch-controlled liquid crystal display of claim 13, wherein the demultiplexer is an m to n demultiplexer, and $2^m \geq n$.

15. The touch-controlled liquid crystal display of claim 1, wherein the output voltage of the first power supply is the same as the output voltage of the second power supply.

16. The touch-controlled liquid crystal display of claim 1, wherein the first demultiplexer is an m to n demultiplexer, and $2^m \geq n$, and the second demultiplexer is a one-to-two demultiplexer.

17. A touch panel for realizing multi-touch control in a flat panel, comprising:
   a plurality of first electrodes parallel with each other;
   a plate shaped second electrode facing the first electrodes;
   a plurality of spacers disposed between the first electrodes and the second electrode for separating the first electrodes and the second electrode;
   a plurality of first control switch pairs;
   two second control switch pairs;
   a first demultiplexer;
   a second demultiplexer;
   a first power supply; and
   a second power supply,
   wherein the first power supply and the second power supply are respectively configured for outputting a voltage, the first electrodes are electrically coupled to the first power supply and the second power supply respectively through the first control switches and the second control switches, the outputs of the first demultiplexer are electrically coupled to the first control switches, a first scanning signal is inputted to the inputs of the first demultiplexer so that a corresponding first control signal is outputted from the outputs of the first demultiplexer so as to sequentially close the first control switch pairs, the outputs of the second demultiplexer are electrically coupled to the second control switches, and a second scanning signal is inputted to the inputs of the second demultiplexer so that a corresponding second control signal is outputted from the outputs of the second demultiplexer so as to sequentially close the second control switch pairs.

18. The touch panel of claim 17, further comprising a plurality of control switch pairs, a demultiplexer and a power supply, the first electrodes are electrically coupled to the power supply through the control switch pairs, the outputs of the demultiplexer are respectively electrically coupled to the control switch pairs so as to control the control switch pairs, and a scanning signal is input to the inputs of the demultiplexer so that a corresponding control signal is output from the outputs of the demultiplexer so as to sequentially close the control switch pairs.

19. The touch panel of claim 17, wherein the demultiplexer is an m to n demultiplexer, and $2^m \geq n$.

20. The touch panel of claim 17, wherein the output voltage of the first power supply is the same as the output voltage of the second power supply.

21. The touch panel of claim 17, wherein the first demultiplexer is an m to n demultiplexer, and $2^m \geq n$, and the second demultiplexer is a one-to-two demultiplexer.

* * * * *